US007895380B2

(12) United States Patent
Pourbigharaz et al.

(10) Patent No.: US 7,895,380 B2
(45) Date of Patent: Feb. 22, 2011

(54) COMMUNICATION PROTOCOL FOR SHARING MEMORY RESOURCES BETWEEN COMPONENTS OF A DEVICE

(75) Inventors: Fariborz Pourbigharaz, Markham (CA); Milivoje Aleksic, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 206 days.

(21) Appl. No.: 12/356,898

(22) Filed: Jan. 21, 2009

(65) Prior Publication Data

US 2010/0185800 A1    Jul. 22, 2010

(51) Int. Cl.
*G06F 13/00* (2006.01)
(52) U.S. Cl. ........................ 710/107; 709/230
(58) Field of Classification Search .......... 709/219, 709/230, 236, 246; 712/18–19; 710/107, 710/306–314, 8, 10
See application file for complete search history.

(56) References Cited

U.S. PATENT DOCUMENTS

| 6,633,296 | B1 | 10/2003 | Laksono et al. |
| 7,346,078 | B2 | 3/2008 | Gulati et al. |
| 7,562,176 | B2* | 7/2009 | Kloeppner et al. .......... 710/314 |
| 2008/0109565 | A1* | 5/2008 | Ajanovic et al. ............... 710/8 |

OTHER PUBLICATIONS

International Search Report; PCT International Application No. PCT/CA2010/000082, filed Jan. 20, 2010; dated Apr. 15, 2010.
"HyperTransport I/O Link Specification", Revision 3.10, HyperTransport Technology Consortium, Jul. 23, 2008, pp. 3, 42, 55, 68-70, 76, 96, 98. Available <http://www.hypertransport.org>.

* cited by examiner

*Primary Examiner*—Clifford H Knoll
(74) *Attorney, Agent, or Firm*—Vedder Price P.C.

(57) ABSTRACT

In a device, such as a cell phone, memory resource sharing is enabled between components, such as integrated circuits, each of which has memory resources. This may be accomplished by providing an interconnect between the components and constructing transaction units which are sent over the interconnect to initiate memory access operations. The approach may also be used to allow for a degree of communication between device components.

28 Claims, 7 Drawing Sheets

This invention relates to memory resource sharing and

COMMUNICATION PROTOCOL FOR SHARING MEMORY RESOURCES BETWEEN COMPONENTS OF A DEVICE

BACKGROUND

This invention relates to memory resource sharing and communication between components of a device.

Modern computing devices are comprised of many independently intelligent components that implement a variety of discrete functions and interact within the overall computing device. For example, an application processor and a graphics processor interact to provide content to the system display. Each independent intelligent component typically has a variable degree of intelligence and component specific local resources available, such as memory resources.

It is known to employ a bus architecture to allow the transfer of data between integrated circuits in a computing device. For memory transfer operations, a direct memory access (DMA) controller may be used to offload the supervision of the bus and memory transfer operations from the central processor unit (CPU), allowing the CPU to perform other functions while memory transfers are ongoing.

As computing devices become more complex and memory resources in the devices become more diffuse, efficient communication methods between components for sharing memory resources would be desirable.

SUMMARY

In a device, such as a cell phone, memory resource sharing is enabled between components, such as integrated circuits, each of which has memory resources. This may be accomplished by providing an interconnect between the components and constructing transaction units which are sent over the interconnect to initiate memory access operations. The approach may also be used to allow for a degree of communication between device components.

According to the present invention, there is provided a method of operating an initiating component needing to access memory-mapped resources when in a device having (i) a plurality of processing components and (ii) a bus interconnecting said plurality of components, comprising: sending from said initiator component needing to access memory-mapped resources toward a target component of said device having memory-mapped resources over a connection on said bus, a plurality of transaction units ("TUs") to establish a channel; said plurality of TUs comprising one or more configuration TUs, each configuration TU having a configuration parameter for said channel; sending a memory access request TU from said initiator component toward said target component over said channel, said memory access request TU having a memory access request.

According to another aspect of the present invention, there is provided a first component for use in a device having a plurality of components and a bus having a physical connection to each of said plurality of components, comprising: a first processor; a connector for connection to said bus such that said first component has a physical connection to said bus; said first processor operable to: send a plurality of transaction units ("TUs") over a connection on said bus toward a second component which has a physical connection to said bus to establish a channel, said second component of a type having a processor and memory, said plurality of TUs comprising one or more configuration TUs, each configuration TU having a configuration parameter for said channel; send a memory access request TU toward said second component over said channel, said memory access request TU having a memory access request.

According to a further aspect of the invention, there is provided a method for facilitating sharing of memory-mapped resources in a device having a plurality of processing components, comprising: sending from an initiator component of said device needing to access memory-mapped resources to a target component of said device having memory-mapped resources over a connection on a bus interconnecting said plurality of components of said device, a plurality of transaction units ("TUs") to establish a channel; said plurality of TUs comprising one or more configuration TUs, each configuration TU having a configuration parameter for said channel; sending a memory access request TU from said initiator component to said target component over said channel, said memory access request TU having a memory access request.

According to another aspect of the invention, there is provided a device having a plurality of components, comprising: a first component having a first processor; a second component having a second processor and memory; a bus; said first component and said second component having a physical connection to said bus; said first processor operable to: send a plurality of transaction units ("TUs") over a connection on said bus to said second component to establish a channel, said plurality of TUs comprising one or more configuration TUs, each configuration TU having a configuration parameter for said channel; send a memory access request TU to said second component over said channel, said memory access request TU having a memory access request.

BRIEF DESCRIPTION OF THE DRAWINGS

In the figures which illustrate example embodiments of this invention.

DETAILED DESCRIPTION

In overview, components of a device may be interconnected in a point-to-point fashion and/or as part of a network. Inside each component, there may be some intelligence (as, for example, where the component is a CPU or DSP or has a state machine) requiring access to internal as well as external memory and input/output (IO) resources. A CPU, for example, can issue read and write cycles across internal bus structures, which are usually parallel—as, for example in an AXI bus structure—in order to access local memory and IO resources. Furthermore, CPU requests can be issued towards remote resources of other external devices which may have been designed around a different internal bus structure, such as OCP. A protocol is described herein which is suitable for conveying internal System on a Chip (SoC) bus transactions for accessing remote memory mapped resources of external devices which may have different internal SoC bus structures.

The protocol defines transaction Units (TUs) which can be encapsulated by a transport layer before transmission over a point-to-point physical link.

Figure 1:
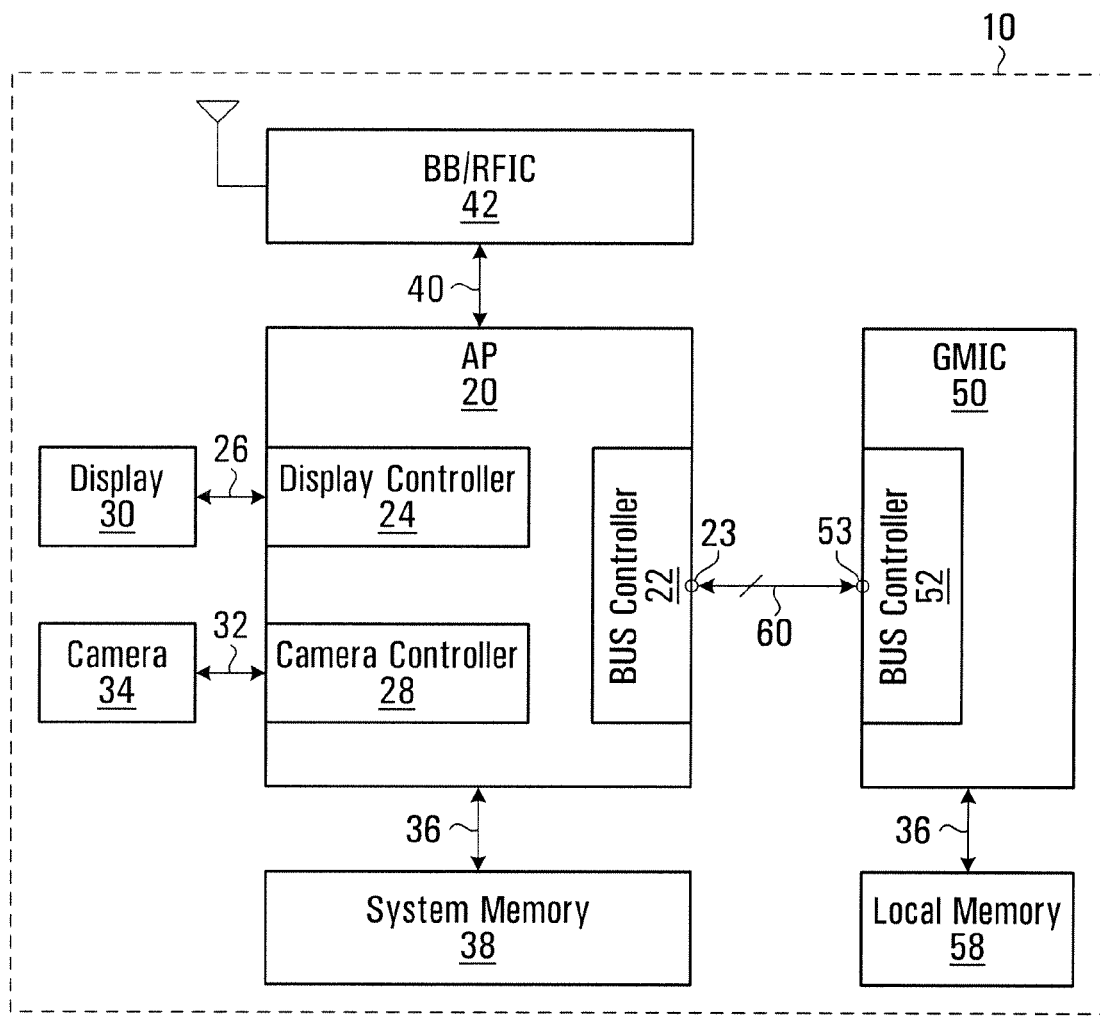
FIG. 1 is a schematic view of a device suitable for operation in accordance with this invention.

Turning to FIG. 1, an exemplary device 10, which is a cell phone, may have a first processing component 20 which is an application processor (AP) integrated circuit (IC), connected to a second processing component 50 which is a graphics multimedia IC (GMIC) over a point-to-point bus 60. Each component has a connector 23, 53 allowing a connection to the bus. Bus 60 may be a parallel or serial pathway between the components. Component 20 has a bus controller 22 which controls bus 60 as well as a display controller 24 and a camera controller 28. A point-to-point connection 26 connects the display controller 24 to a display 30 and a second point-to-point connection 32 connects the camera controller 28 to a camera 34. Component 20 also has a point-to-point connection 36 with system memory 38 and a point-to-point connection 40 with a baseband and/or radio frequency integrated circuit (BB/RFIC) 42.

Component 50 has a bus controller 52 which controls bus 60. Component 50 also has a point-to-point connection 56 with a local memory 58.

Figure 2:
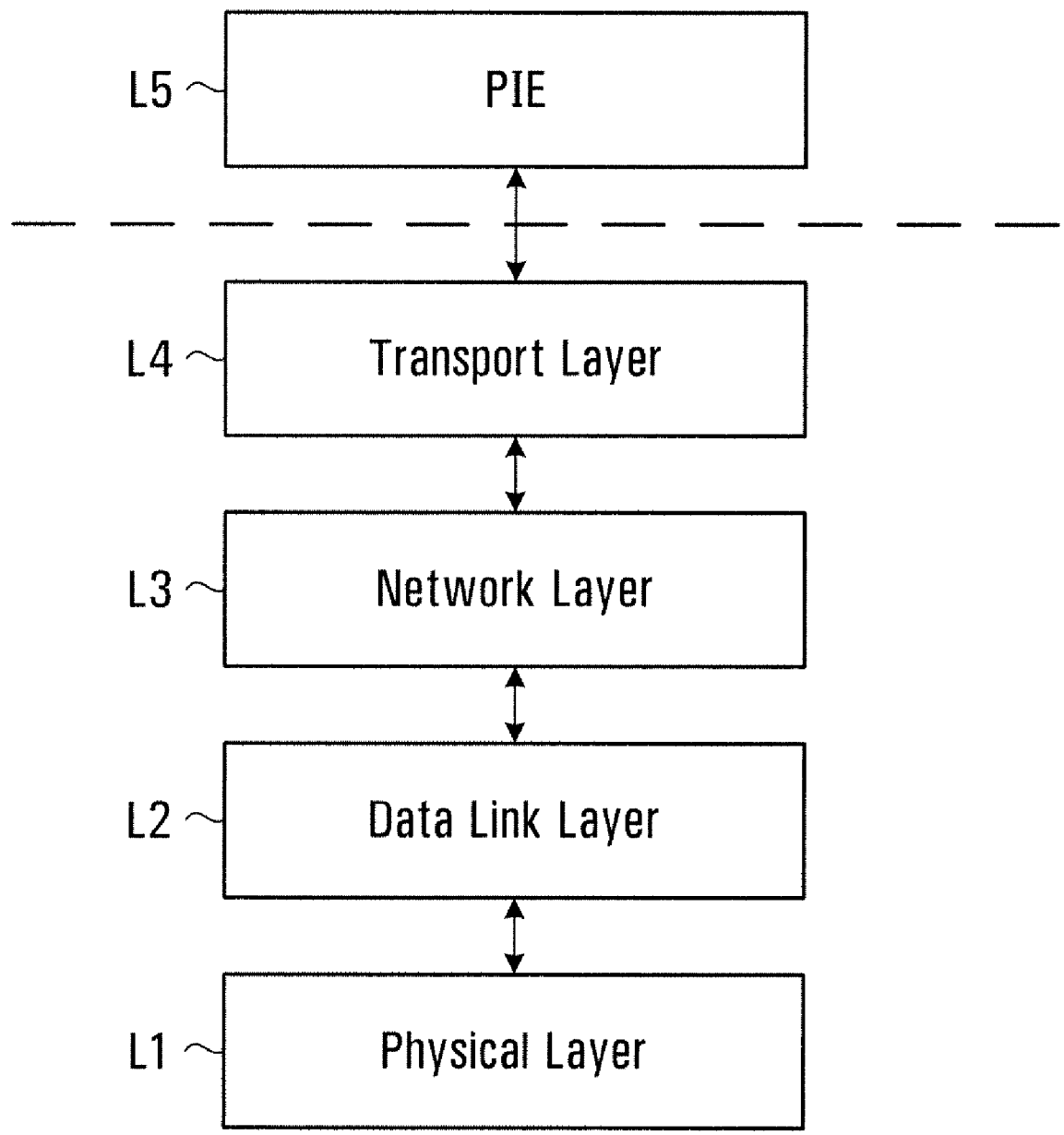
FIG. 2 is a schematic view of a protocol stack which may be employed in the device of FIG. 1.

Communications over bus 60 could be accomplished via, for example, a layered open systems interconnection reference model (OSI model), which is well understood in the art, or via a similar network or point-to-point interconnect. For example, a five layer architecture may be implemented to permit an initiating component (i.e., one of component 20 or 50) direct access to memory resources of a target component (the other of component 20 or 50). The layered architecture may be as illustrated in FIG. 2 where the layers depicted by L1-L4 generally correspond to the functionality provided by layers 1-4 of the OSI model.

The desired remote access to memory resources may be implemented by constructing a layer, L5, as a processor interface emulation (PIE) protocol layer. For comparison to the OSI model, layer L5 in this description may be assumed to correspond to the hardware or software functionality implemented above layer L4 of the OSI model.

Analogous to the OSI model, each successive layer provides an interface to deal with the layers located above and below it in the hierarchy to allow data and commands to be passed between layers. The PIE protocol layer L5 is designed to be an independent and encapsulated layer that communicates with the transport layer L4 in order to implement a transaction. The PIE protocol initiates a transaction by calling a transport layer L4 function and passing data to the transport layer L4. In response to this request, the transport layer L4 makes use of the facilities provided by the network layer L3, which in turn utilizes the facilities provided by lower layers.

Returning to FIG. 1, if a sub-component of component 20, such as display controller 24, wished to access a block of memory in local memory 58 of component 50, component 20 could initiate a memory access operation—and so may be termed an initiating component, while component 50 may be termed the target component. Assuming the internal bus structure within component 20 was AXI, this request from the display controller would appear as an AXI bus transaction within component 20 (i.e., as a memory access request according to the AXI bus protocol). The PIE layer L5 within component 20 (which could be a part of bus controller 22) would take this AXI bus request and convert it to a PIE transaction which would then be transported across bus 60 using layers L4-L1. The corresponding PIE layer L5 within component 50 would interpret the arriving PIE transaction and convert it to its own internal bus request accordingly (i.e., as a memory access request according to its own bus protocol). Thus, if component 50 was designed around an OCP bus structure rather than an AXI bus structure, the PIE layer L5 within component 50 would extract values from the memory access request TU and use these to formulate an OCP bus request. In this way, a memory block of target component 50 is effectively treated as a block within memory address space of initiating component 20 by applications running on component 20. Similarly, with component 50 acting as the initiator, a block of memory in system memory 38 can be treated as a block of memory in the component 50.

As will be appreciated by those skilled in the art, each block of memory will typically be a logical block of memory which maps to physical memory locations. As will further be appreciated by those skilled in the art, memory resources in a component need not be a memory, per se, but may be any data storage facility (such as registers).

Figure 3:
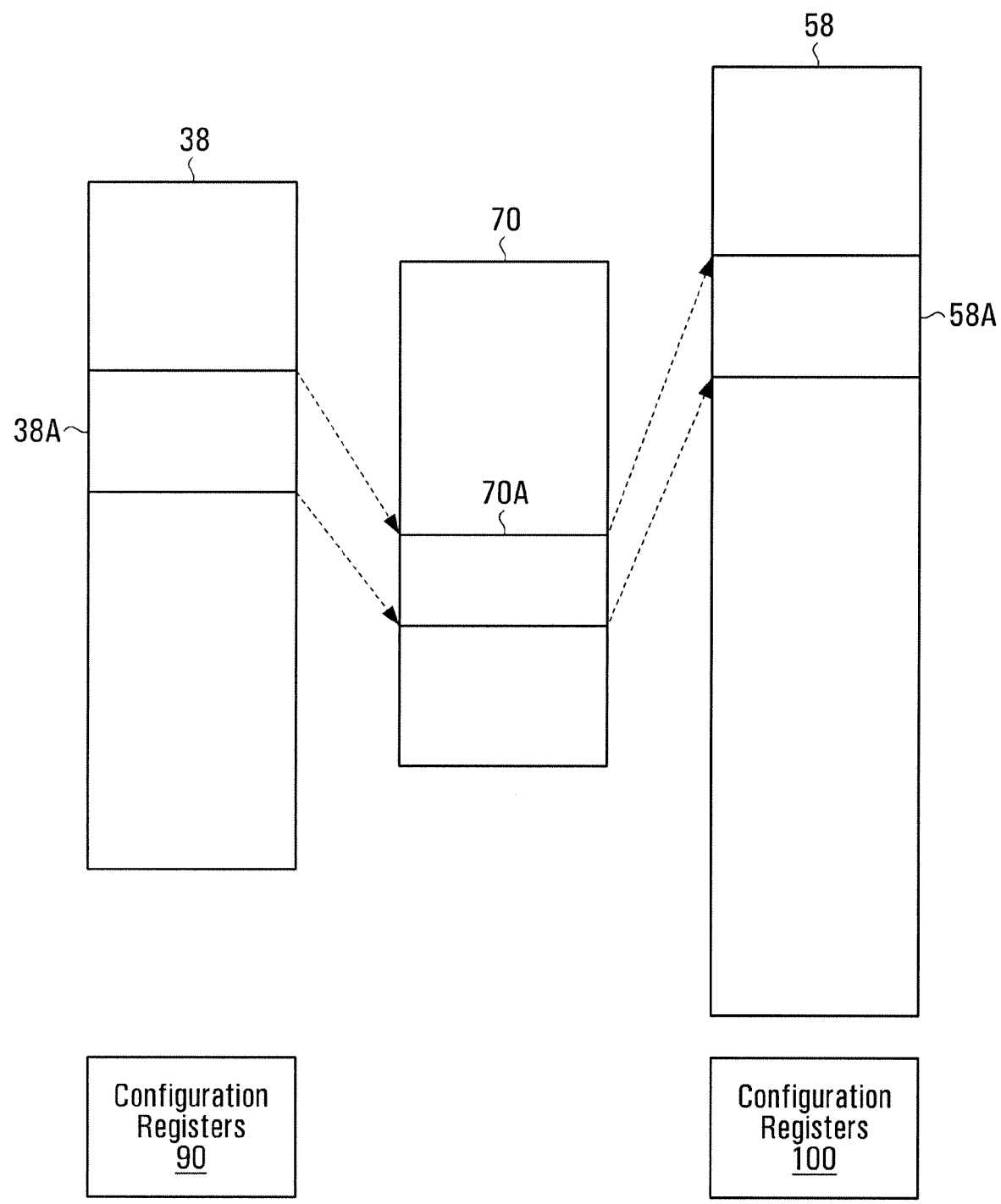
FIG. 3 is a schematic view of memory spaces in the device of FIG. 1.

FIG. 3 depicts an illustrative example of memory mapping with component 20 acting as the initiating component. Specifically, a memory-mapped aperture 58A within local address space 58 of component 50 is mapped to aperture 70A within PIE memory address space 70. The aperture 70A in PIE memory address space is then mapped to aperture 38A within system memory 38 of component 20. PIE memory address space 70 represents a virtual address space that facilitates the mapping between the initiating and target memory address spaces. PIE memory space 70 is an abstraction employed to aid memory mapping and does not correspond to any physical memory location. Both the initiating component 20 and the target component 50 interact with PIE memory space 70 to accomplish the mapping from memory aperture 58A of the target component to memory aperture 38A of the initiating component via PIE aperture 70A. Thus, a given address in memory 58 of component 50 may have a different address in the memory 38 of component 20, and a different address again in PIE memory space 70.

The mapping of memory to PIE memory space may be accomplished in any suitable fashion employing configuration registers 90, 100 at the AP 20 and GMIC 50, respectively. It will therefore be apparent that address translation or memory mapping between the initiating and target components is accomplished via PIE memory space 70 to translate between a local address in memory 38 of the initiating component and a remote address in target memory 58 of the target component.

The block of memory defined by an address and a size in initiating (i.e. local), target (i.e. remote) or PIE address spaces may be considered to be a memory aperture. Each aperture represents a contiguous block of memory addresses which map from one component to another.

Figure 4:
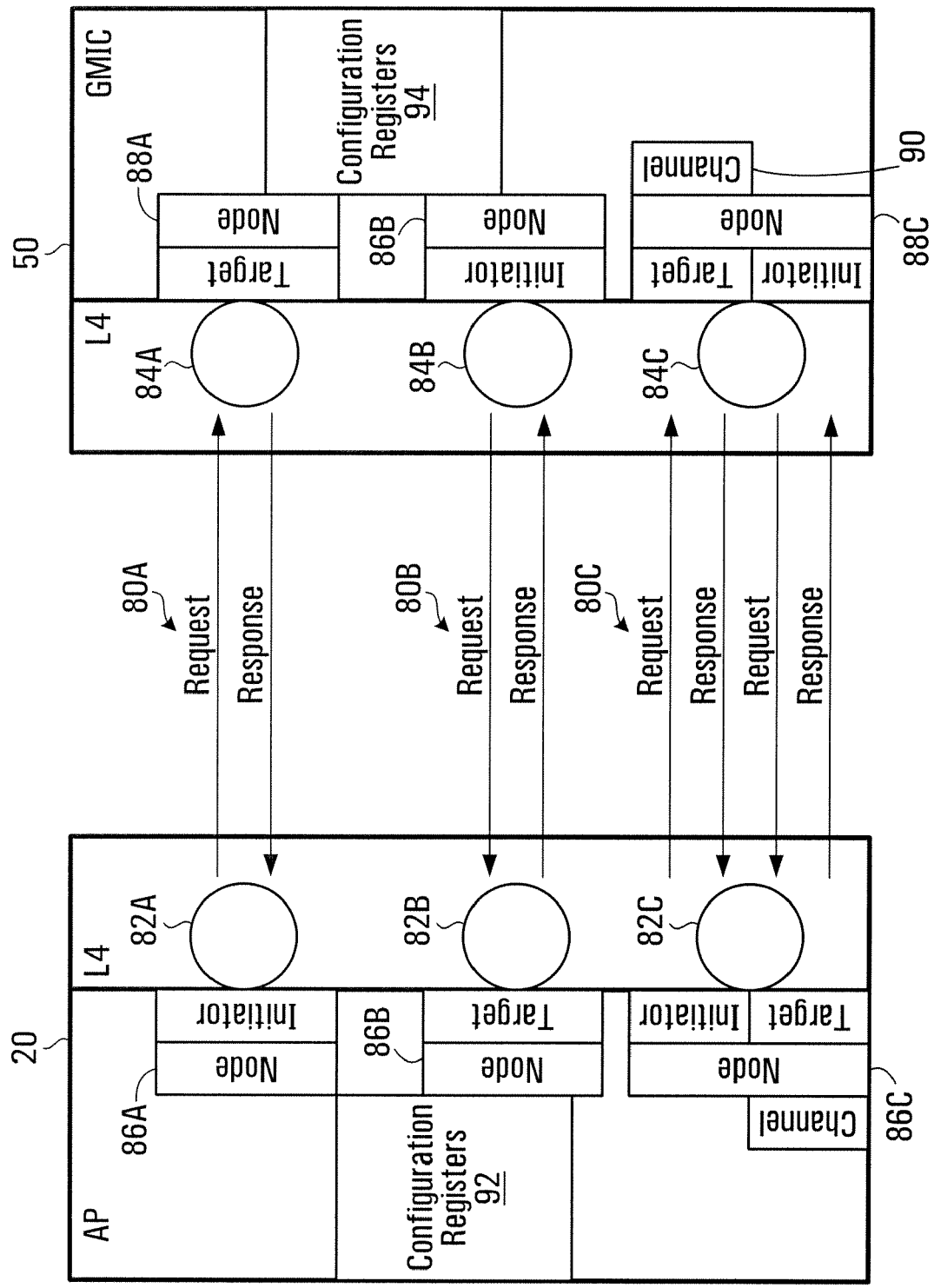
FIG. 4 is a schematic operational view of a portion of the device of FIG. 1, and FIGS. 5 to 9 are schematic views of transaction units that may be communicated in the device of FIG. 1.

Returning to FIG. 1, the protocol employed by device 10 is used to establish a connection between the AP 20 and GMIC 50 over the point-to-point bus 60. The PIE protocol may then be used to establish one or more channels over this connection and one or more apertures on each channel. More specifically, by way of example, turning to FIG. 4, three connections 80A, 80B, 80C may be established between AP 20 and GMIC 50 across the point-to-point bus through layers L1, L2, and L3 of the network protocol. Layer L4 may establish a port terminating each connection at each component. Specifically, ports 82A, 84A may terminate connection 80A at AP 20 and GMIC 50, respectively, while ports 82B, 84B may terminate connection 80B, and ports 82C, 84C may terminate connection 80C. Each of these network connections may support a different traffic class (i.e., each connection may have different connection parameters, such as latency). The PIE protocol at AP 20 could then associate a node (86A, 86B, 86C) with each port (82A, 82B, 82C, respectively). Similarly, the PIE protocol at GMIC 50 could associate a node (88A, 88B, 88C) with each port (84A, 84B, 84C, respectively). In order for a local component to access memory resources of a remote component across a link, a node at the local component becomes an initiator node and a node at the remote component becomes a target node. Thus, a node (such as node 86A) can be an initiator node, a target node (such as node 86B) or both an initiator and target node (such as node 86C). An initiator node can send requests over a connection to a target node in order to set up a channel and, optionally, one or more apertures within that channel. Specifically, as more fully described hereinafter, the initiator node (such as node 86C) could send transaction units (TUs) over a connection with configuration parameters to a target node (88C) to set up a channel (channel 90) and apertures. The configuration parameters received by way of the TUs are stored in configuration registers 92, 94. Thus, a given channel has a specific initiator node (e.g., node 86C of AP 20) and a specific target node (e.g., 88C of GMIC 50) associated with it. Further, each connection can support up to two channels, with one channel in each direction so that, on a single connection, one node (e.g., node 86*c*) can act as initiator node on one channel and target node on a second channel.

Where multiple apertures are defined on a single channel, each aperture will share the same channel parameters.

Figure 5:
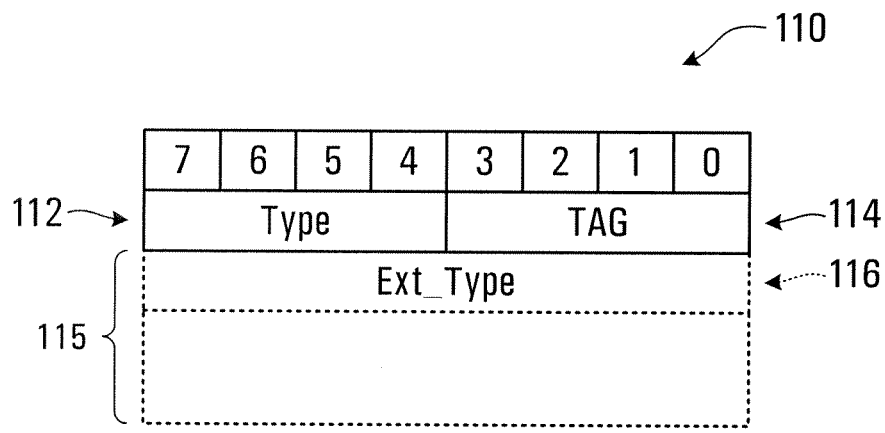

As suggested hereinbefore, communication between components may be accomplished by the PIE protocol layer L5 through the use of transaction units (TUs) that are passed to the transport layer L4 for delivery from the initiating component to the target component. In general, the protocol data unit (PDU) at L5 may be referred to as a Message, which may be broken into multiple Segments (i.e. L4 PDUs), Packets (i.e. L3 PDUs) and Frames (i.e. L2 PDUs) before being transmitted over a physical layer. PIE Messages are composed of Transaction Units. A generalized depiction of a possible transaction unit format is depicted in FIG. 5. The first byte of the transaction unit 110 is divided into a type 112 field, for storing the nature of the TU, and a tag 114 field, for storing a transaction identifier. The remainder of the transaction unit 110 is comprised of optional information 115 that may be present and varies depending on the type 112 of the transaction unit 110. For example, an optional second byte of transaction unit 110 may represent an Ext_Type field 116 for storing the nature of the TU if the TU 110 is of an extended type.

The type field 112 is used to identify the purpose of the transaction unit 110. Supported transaction unit types may include those listed in Table 1.

TABLE 1

| Type | ID | Transaction Unit Type |
|---|---|---|
| 0000 | WR | Direct Write request |
| 0001 | WRi | Indirect Write request |
| 0010 | RD | Direct Read request |
| 0011 | RDi | Indirect Read request |
| 0100 | ACK | Write acknowledge response |
| 0101 | | Reserved |
| 0110 | RES | Read response |
| 0111 | | Reserved |
| 1000 | WRc | Configuration write |
| 1001 | REP | Request Interrupt or Report (error/status) |
| 1010 | RDc | Configuration read |
| 1011 | SYNC | Request synchronization |
| 1100 | SYNC-ACK | Response to SYNC when synchronization complete |
| 1101 | REP-ACK | Response to REP |
| 1110 | EXT-RSP | Response to EXT-REQ |
| 1111 | EXT-REQ | Extended transaction request |

The Ext_Type 116 field in FIG. 5 is only present in transaction units 110 that are of extended type (i.e. Type=1110 or 1111 in Table 1). The presence of the Ext_Type 116 field allows additional transaction unit types to be defined in this field. The implementation of the type field 112 is exemplary and other variations can be used provided a unique value is used to identify the type of the transaction unit. For example, a larger number of transaction unit types could be supported by a larger type field, if desirable in a particular application.

The tag field 114 is used to associate TUs related to a particular split transaction. Optionally, it could also be used to allow maintenance of an order for transactions. More specifically, each initiator node associated with a network connection is assigned a tag pool, for example, sixteen consecutive values. Then, if the initiator wishes to send a TU, such as a direct write request (WR), the next available tag is placed in the tag field of that TU. One of the configuration parameters for a channel may be whether or not write requests are to be acknowledged. If write requests are to be acknowledged, the target will respond to the write request TU (i.e. WR) by constructing a write acknowledge TU (i.e. ACK) in which the target will insert the same tag value as was inserted in the initiating TU. When the initiator receives this write acknowledge TU, the tag field is read to correlate the TU as a response to the initiating TU. A tag value is reserved after it is inserted in an initiating TU until the completion of the transaction initiated by that TU. A transaction is typically completed when a response is received to an initiating TU.

Figure 6:
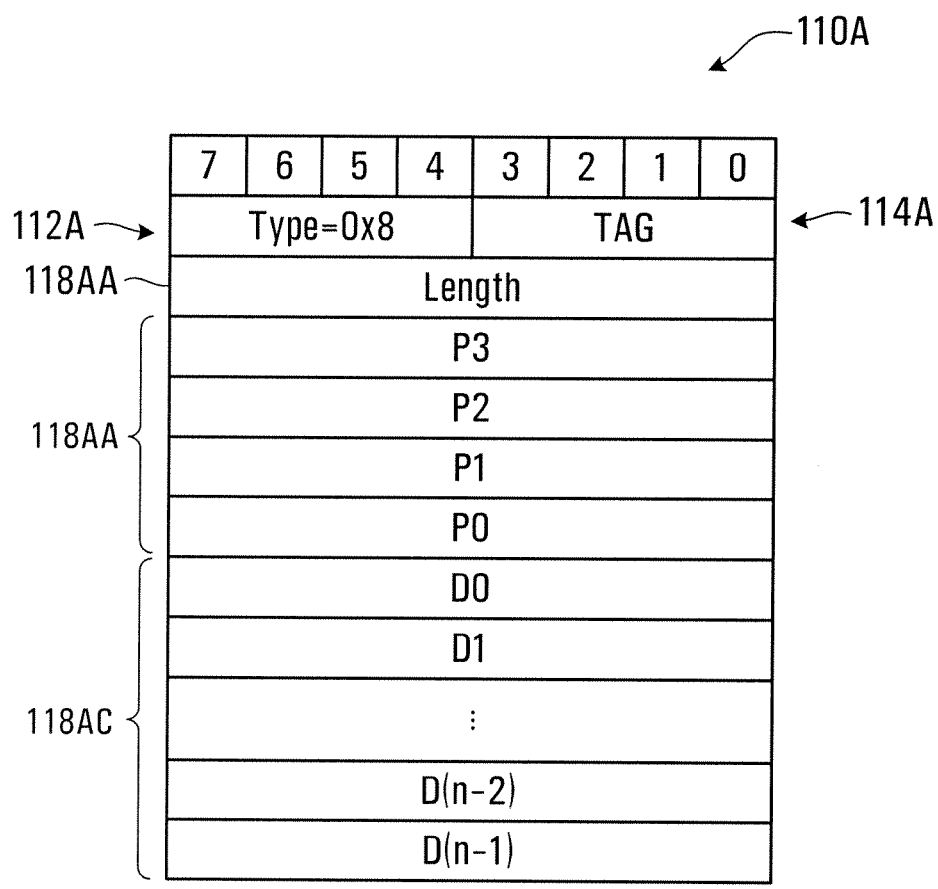

As will be apparent from Table 1, configuration write (WRc) and a configuration read (RDc) are two defined types of TUs. A WRc TU is used by an initiator to set configuration register values at a target in order to, for example, establish a channel or an aperture on a channel. The specific format of a WRc TU is shown in FIG. 6. Turning to this figure, as suggested by Table 1, the type field 112A of the WRc TU 110A is set to 1000 and the tag field 114A is set to the next available tag value. The WRc TU has a length field 118AA which indicates the length of a parameter value field 118AC. This allows the target of the TU to delineate the end of the parameter value field—and the TU. In another embodiment, the length field could be replaced by an end of TU marker inserted at the end of the TU. The remainder of the transaction unit is comprised of a four byte parameter field 118AB (with a parameter ID) identifying which configuration parameter is to be modified by the WRc TU and the parameter value field 118AC which represents the value of the configuration parameter to be stored. In response to a WRc TU, a write acknowledge transaction unit (ACK TU) may be generated by the target. The ACK TU is comprised only of a type and a tag.

The value of configuration parameters may be accessed using a configuration read request transaction unit (RDc TU). An RDc TU has the same format as a WRc TU except that there is no parameter value field. The parameter field of an RDc TU has a parameter ID which serves to indicate which parameter value is to be returned and the length field indicates the length of the parameter which is to be returned. In response to an RDc TU, the target returns a read response (RES) TU consisting of Type, Tag and Length fields containing the intended parameter values.

Configuration read requests may be used to provide a level of communication between components. For example, a specific parameter ID may be reserved for an identification of the manufacturer of a component and another parameter ID may be reserved for an indication of a model of the component. An initiator component may have a database associating different specific components with different abilities. Therefore, by identifying a target component, an initiator component may learn the capabilities of the target component which may assist the initiator component in making more effective use of memory resources of the target component. Further, in certain instances after establishing a connection, low level communications between components using configuration read and writes may be all that is required. In such instances, no channels need to be established between the components.

Figure 7:
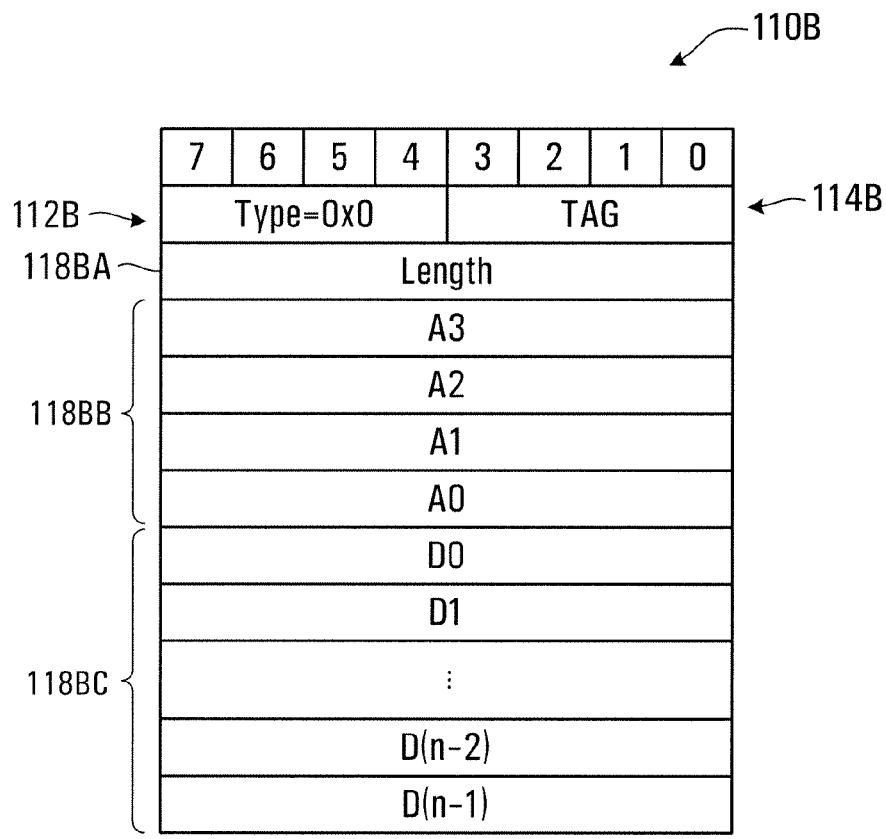

The specific format of a direct write transaction unit (WR TU) is shown in FIG. 7. Referencing this figure, the WR TU 110B has a type field 112B set to 0000 in accordance with Table 1. The WR TU also has a tag field 114B and length field 118BA, similarly to the WRc TU. The address field 118BB is a 32-bit field for storing the base address where the write operation is to start. (As aforenoted, this base address is in PIE space and may be mapped to another address at the target. Further, the base address will lie within a previously defined memory aperture for direct read and write requests.) The data field 118BC is for storing the block of data to be written. The value in the length field indicates the length of the data field. It will be appreciated by those skilled in the art that the maximum length of the data field is 256 bytes as this is the maximum length is represented by the 8-bit length field. Alternative embodiments could utilize a larger length field or an extended type TU to allow for larger data blocks.

Upon receipt at the target component of a WR TU, the address in the address field is translated from PIE address space 70 (FIG. 3) to an address within the target address space. In response to a direct write request transaction unit 110B, a write acknowledge transaction unit, as described above in conjunction with the discussion of WRc TUs, may be generated (using the same tag field value) by the target component and transmitted to the initiating component.

The transaction unit format for direct read transaction units (RD TUs) may be the same as the format for the direct write transaction units described above except that a direct read request transaction unit will have no data field. In an RD TU, the value in the length field will indicate the length of the data block to be returned. In response to a direct read request an RES TU may be generated by the target.

Figure 8:
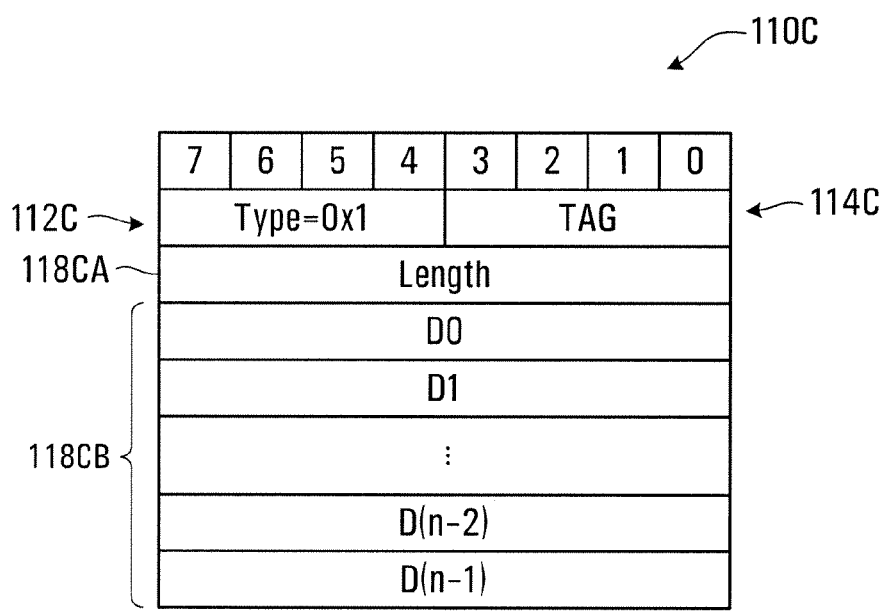

Indirect read and write requests may also be supported for data streaming applications. To allow for indirect requests, an initiator may send configuration TUs to establish a channel and configure a base address and a length to create a memory aperture for indirect read requests and a base address and length to create a memory aperture for indirect write requests. The indirect base addresses are in PIE address space. The specific format of an indirect write request (WRi) transaction unit 110C is depicted in FIG. 8. TU 110C has a type field valued at 0001, a tag field 114C, a length field 118CA and a data field 118CB. When the target receives such a TU, it writes the block of data in the data field to its memory beginning at an address to which the indirect write base address stored in its configuration register maps. It also increments the address in this register so that the updated address will be used for the next indirect write on the channel. (If an indirect write extends past the end of the aperture for indirect writes, the indirect write wraps around to the beginning of the aperture.) An indirect read TU (RDi TU) has the same format as a WRi TU except it lacks a data field. These indirect requests allow for successive read and write operations without incurring the overhead of transmitting address information.

In response to an indirect write transaction unit, if the channel is configured for acknowledgements, a target will respond with an ACK TU. Also, a RES TU will be issued in response to an indirect read transaction, as discussed above.

Figure 9:
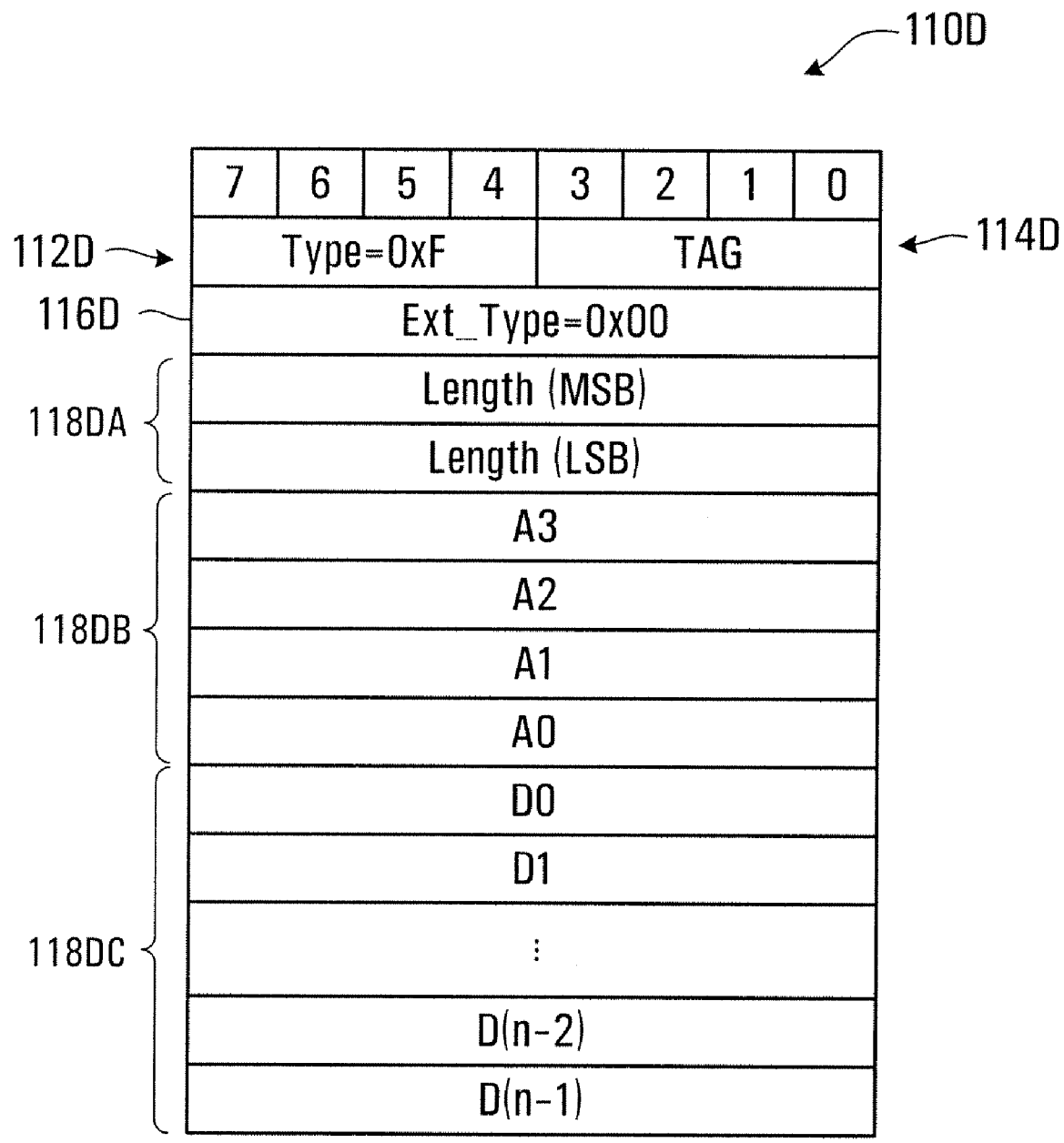

A bulk write transaction unit 110D is represented in FIG. 9 as an example of an extended transaction unit. The type field 112D has a value of 1111 indicating that the transaction unit is an extended transaction unit and the specific type is identified by the Ext_Type field 116D. The transaction unit has a tag field 114D. The length field 118DA represents the length of the data field 118DC to be written in bytes and is represented by a 16-bit field allowing for larger data blocks. The address 118DB indicates a starting address for the write. The bulk write transaction unit 110D is advantageous where large blocks of data need to be transferred between components. In response to a bulk write transaction unit, an ACK TU may be generated.

A bulk read TU may also be employed to provide bulk read functionality. This TU is the extended type equivalent of the direct read request. In response to this TU, the target will issue a bulk read response TU with Type=EXT_RSP, as indicated in Table 1, and a dedicated Ext_Type which contains the requested data.

A REP TU may be supported to provide analogous functionality to a hardware interrupt and other error reporting functions. A REP TU may have a type, tag, length, code and other optional data fields. The code field indicates whether the TU is an interrupt request or, if not, indicates the nature of the error. Lastly, the REP TU may have a data field for data germane to the various possible types of report. In response to a REP TU, a REP-ACK TU may be issued by the receiver to acknowledge and indicate success or failure of the interrupt or error reporting mechanism.

A SYNC TU is used for resynchronization and is composed of a type and a tag field. For example if TUs arrive at the target with out-of-order tag values, the target can complain with a REP TU to report the error to the initiator. The initiator will then resynchronize using SYNC TU. This effectively resets tag values at both sides. In response to a SYNC TU, the target issues a SYNC-ACK and the initiator may then resume normal operation, starting the first TU with a tag having a value which is the first value in the tag pool.

A channel can be configured for detecting and responding to both direct and indirect addressing requests. There can be multiple apertures—usually none overlapping in PIE address space—configured within each channel for responding to direct requests. Every aperture has a set of attributes and registers such as base address, length and access control registers for security which can be configured individually. Also, every channel can support a base address and a length register for indirect read operations and another base address and length register for indirect write operations.

As aforedescribed, an initiator component can send WRc TUs to write configuration parameters into the configuration registers of the target in order to set up a channel and one or more apertures on the channel. Specific configuration parameters can include the following:

a CONNECTION_ID parameter which gives an identity to a particular network connection, one or two channels may then be associated with the particular CONNECTION_ID;

an ENABLE_WR_ACK parameter for each channel to selectively require that direct write TUs received by the target must be acknowledged; a similar parameter may be used for enabling acknowledgement of indirect write request TUs.

an Rdi_BASE_ADDRESS to specify the base address in PIE addressing space where the first (or next) indirect read will be performed; a similar parameter may specify an address for the first indirect write for each channel;

an APERTURE_BASE parameter to specify a base address (address in PIE addressing space) of an aperture within a channel; and an APERTURE_LENGTH parameter to specify the aperture size.

As an alternative, each component may set its own configuration registers to default or other specific values after start-up and those values may be read by an initiator component (using RDc TUs) before initiating any memory sharing transaction. Further, in such instance, an initiator component could send WRc TUs to re-set any of these configuration parameters (unless a Remote_Config_Blocked parameter in the global configuration of the target was set to prevent remote configuration).

The PIE protocol is a general protocol and may be implemented in a variety of contexts between two or more components capable of supporting the PIE protocol. For example, as has been described, the PIE protocol may be implemented between an application processor (AP) and a graphics processor (GMIC) connected over a point-to-point network. Alternatively, the protocol may be implemented over three or more different components connected together by a shared network bus or a switch.

Each component of a device implementing the PIE protocol could be a collection of elements for performing a function, or could be a single integrated circuit.

Other modifications will be apparent to those skilled in the art and, therefore, the invention is defined in the claims.

What is claimed is:

1. A method of operating an initiating component needing to access memory-mapped resources when in a device having (i) a plurality of processing components and (ii) a bus interconnecting said plurality of components, comprising:

sending from said initiator component needing to access memory-mapped resources toward a target component of said device having memory-mapped resources over a connection on said bus, a plurality of transaction units ("TUs") to establish a channel;

said plurality of TUs comprising one or more configuration TUs, each configuration TU having a configuration parameter for said channel;

sending a memory access request TU from said initiator component toward said target component over said channel, said memory access request TU having a memory access request.

2. The method of claim 1 further comprising receiving from a sub-component of said initiating component a sub-component memory access request according with a bus protocol of said initiating component and formulating said memory access request TU from said sub-component memory access request.

3. The method of claim 1 further comprising indicating a transaction type for each TU in a type field of each TU.

4. The method of claim 3 wherein said type field indicates a read request.

5. The method of claim 4 wherein said read request is one of a direct read request and an indirect read request.

6. The method of claim 5 wherein said read request is one of a memory read request and a configuration parameter read request.

7. The method of claim 3 wherein said type field indicates a write request.

8. The method of claim 7 wherein said write request is one of a direct write request and an indirect write request.

9. The method of claim 8 wherein said write request is one of a memory write request and a configuration parameter write request.

10. The method of claim 3 further comprising including a tag in a tag field of each said TU.

11. The method of claim 10 further comprising monitoring at said initiator component for a response TU on said channel with a tag equivalent to said tag.

12. The method of claim 11 wherein said memory request TU indicates a write request and said type field of said response TU indicates an acknowledgement.

13. The method of claim 11 wherein said memory request TU indicates a read request and said type field of said response TU indicates a read response.

14. The method of claim 3 further comprising, for each given TU which is a configuration TU or a memory access request TU, including a length of the payload of said given TU in a length field of said given TU.

15. The method of claim 2 wherein said formulating said memory access request TU from said sub-component memory access request comprises mapping between a local address space and an interface memory address space and wherein said sending one or more configuration TUs comprises sending configuration TUs with configuration values to allow mapping between said interface memory address space and a local address space at said target component.

16. The method of claim 15 wherein said sending one or more configuration TUs comprises sending a configuration TU with a configuration value indicating a starting address in interface memory address space and a configuration value indicating a length.

17. The method of claim 16 wherein said starting memory address is a starting memory address for one of indirect read or indirect write requests and said length is a length for a memory aperture for said one of indirect read or indirect write requests.

18. The method of claim 16 wherein said starting memory address is a starting memory address for a memory aperture in said interface memory address space for direct write and read requests and said length is a length of said aperture.

19. The method of claim 1 wherein said channel is a first channel and said plurality of TUs is a first plurality of TUs to establish said first channel, said first channel for sending memory access requests from said initiator component toward said target component and further comprising sending a second plurality of TUs for establishing a second channel over said connection, said second channel for sending memory access requests from said target component toward said initiator component.

20. A first component for use in a device having a plurality of components and a bus having a physical connection to each of said plurality of components, comprising:

a first processor;

a connector for connection to said bus such that said first component has a physical connection to said bus;

said first processor operable to:

send a plurality of transaction units ("TUs") over a connection on said bus toward a second component which has a physical connection to said bus to establish a channel, said second component of a type having a processor and memory, said plurality of TUs comprising one or more configuration TUs, each configuration TU having a configuration parameter for said channel;

send a memory access request TU toward said second component over said channel, said memory access request TU having a memory access request.

21. The first component of claim 20 wherein said first processor is also operable to convert a memory access request according with an internal bus protocol of said first component to said memory access request TU.

22. The first component of claim 21 wherein said first processor, in converting said memory access request according with an internal bus protocol of said first component to said memory access request TU, maps between a local address space at said first component and an interface memory address space and wherein said first processor is also operable to, in sending one or more configuration TUs, sending configuration TUs with configuration values to allow mapping between said interface memory address space and a local address space at said second component.

23. The first component of claim 22 wherein said first processor is further operable to:

construct each said configuration TU with a type field indicating each said configuration TU is a configuration TU; and construct said memory access request TU with a type field indicating said memory access request TU is a memory access request TU.

24. A method for facilitating sharing of memory-mapped resources in a device having a plurality of processing components, comprising:

sending from an initiator component of said device needing to access memory-mapped resources to a target component of said device having memory-mapped resources over a connection on a bus interconnecting said plurality of components of said device, a plurality of transaction units ("TUs") to establish a channel;

said plurality of TUs comprising one or more configuration TUs, each configuration TU having a configuration parameter for said channel;

sending a memory access request TU from said initiator component to said target component over said channel, said memory access request TU having a memory access request.

25. The method of claim 24 further comprising receiving from a sub-component of said initiating component a sub-component memory access request according with a bus protocol of said initiating component and formulating said memory access request TU from said sub-component memory access request.

26. The method of claim 25 further comprising receiving said memory access request TU at said target component and extracting values from said memory access request TU to formulate a local memory access request according with a bus protocol of said target component.

27. The method of claim 25 further comprising sending a response TU from said target component to said initiator component in response to receiving said memory access request TU.

28. A device having a plurality of components, comprising:

a first component having a first processor;

a second component having a second processor and memory;

a bus;

said first component and said second component having a physical connection to said bus;

said first processor operable to:

send a plurality of transaction units ("TUs") over a connection on said bus to said second component to establish a channel, said plurality of TUs comprising one or more configuration TUs, each configuration TU having a configuration parameter for said channel;

send a memory access request TU to said second component over said channel, said memory access request TU having a memory access request.

* * * * *